No. 738,061. PATENTED SEPT. 1, 1903.
W. PENNY.
FRUIT PICKER.
APPLICATION FILED NOV. 25, 1902.
NO MODEL.

Witnesses
Edwin G. McKee
Herbert D. Lawson

Inventor
William Penny
By Victor J. Evans
Attorney

No. 738,061. Patented September 1, 1903.

UNITED STATES PATENT OFFICE.

WILLIAM PENNY, OF LANGDON, MISSOURI.

FRUIT-PICKER.

SPECIFICATION forming part of Letters Patent No. 738,061, dated September 1, 1903.

Application filed November 25, 1902. Serial No. 132,757. (No model.)

*To all whom it may concern:*

Be it known that I, WILLIAM PENNY, a citizen of the United States, residing at Langdon, in the county of Atchison and State of Missouri, have invented new and useful Improvements in Fruit-Pickers, of which the following is a specification.

My invention relates to new and useful improvements in a device for picking small fruit; and its object is to provide an extremely simple and inexpensive device which may be readily attached to a finger and which is provided with a hooked cutter, whereby the stems of small fruit may be readily cut and the fruit deposited in the hand without being bruised or otherwise injured.

Another object is to so construct the device as to permit it to be worn upon fingers of various sizes, and it is so shaped as to form a rest for the first joint of the finger, which prevents the accidental removal of the cutter from position and protects said finger-joint from injury by the edge of the cutter.

With the above and other objects in view the invention consists in the novel construction and arrangement of the several parts, which will be more fully hereinafter described and claimed.

Figure 7:
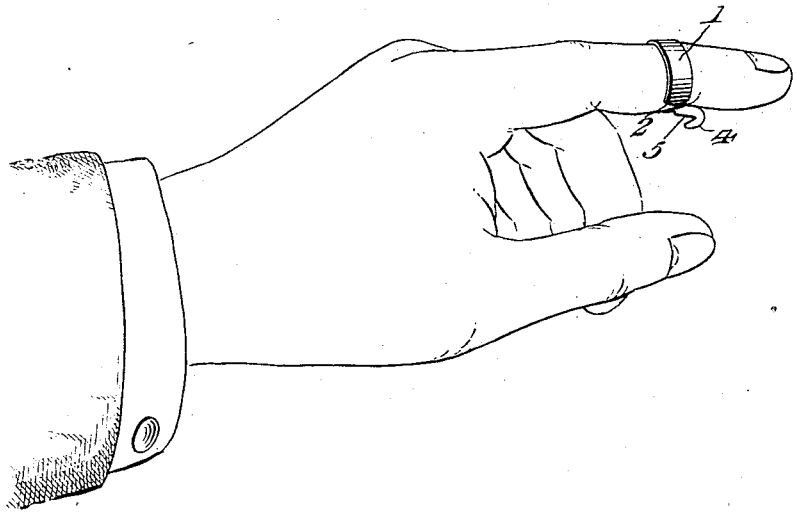
Figure 2:
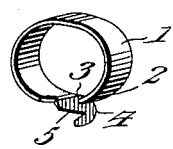
Figure 3:
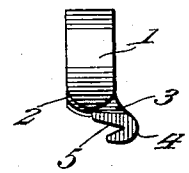
Figure 4:
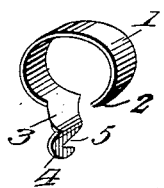
Figure 5:
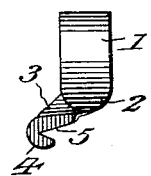

In the drawings, Figure 1 is a view showing the device in position upon a finger. Fig. 2 is a rear perspective view of the device as constructed for use upon the left hand. Fig. 3 is a side elevation thereof. Fig. 4 is a front perspective view of a fruit-gatherer for use upon the right hand, and Fig. 5 is a side elevation thereof.

Referring to the figures by numerals of reference, 1 is a spring-metal band curved to form a ring, and one end thereof is rounded, as shown at 2, to prevent injury to the finger of the wearer. The opposite end is provided with an outwardly-extending and downwardly-inclined rest 3, at the edge of which is arranged a hook 4, having a V-shaped recess 5 therein. This hook is bent at substantially right angles to the rest 3, and the recess 5 extends inward from the rear edge of the hook and is provided with sharpened edges.

In operation the ring is placed upon the finger at a point directly in rear of the outer joint thereof. When it is desired to pick a berry or other small fruit, the stem is caught within the hook 4 and is cut, when said hook is drawn inward, the fruit thereby being deposited in the hand of the operator. The action of drawing the hook back will cause the first joint of the finger to involuntarily bear down upon the inclined rest 3, thereby preventing the device from accidentally slipping from the finger. The rest 3 also prevents injury to the first joint of the finger, such as would be occasioned by continually pressing down upon the forward edge of the band or upon the hook 4. As the band 1 is formed of spring metal and has its ends free of each other, it can be readily adjusted to fingers of different sizes. It will be seen that the hook 4 is a continuation of the band and projected material in advance of the front edge of said band, so that when the first joint of the finger having the ring disposed thereon is pressed downwardly to bear upon the upper edge of the hook a reliable and positive engagement of the said finger-joint with the hook will ensue in view of the normal projection of the upper edge of the hook under the first joint of the finger and the disposal of the ring on the finger in such position as to obtain the placement of the hook, as stated. The downward pressure of the first joint of the finger on the upper edge of the hook will necessarily increase the binding-pressure of the ring on the finger, and such increase in binding-pressure will serve to prevent displacement of the ring during the operation of severing the stem of the berry. Moreover, it will be seen that the recess 5 opens outwardly through the rear edge of the hook, and the upper wall of said recess will receive the greater impact of the stem when pressure is applied to the latter by the thumb of the hand of the operator. The lower edge of the hook is blunt or unsharpened in order to avoid injury to the thumb of the hand of the operator during the picking operation.

Having thus described the invention, what is claimed as new is—

1. A picker of the class set forth consisting of a band or ring of spring metal having the lower ends free, one of said ends continuing into a downwardly and forwardly projected hook with a recess opening outwardly through the rear edge thereof, the upper edge of the hook being projected materially in advance of the front edge of the band or ring.

2. A picker of the class set forth, consisting of a band or ring of spring metal having the ends free and one end continued into a downwardly-inclined and forwardly-projected hook, the upper edge of the hook being extended materially in advance of the front edge of the band or ring and disposed in a plane substantially at right angles to the adjacent portion of the band or ring.

In testimony whereof I affix my signature in presence of two witnesses.

WILLIAM PENNY.

Witnesses:
H. W. MORGAN,
JOHN D. DOPF.